United States Patent
Yagi

(10) Patent No.: US 7,624,404 B2
(45) Date of Patent: Nov. 24, 2009

(54) COMMUNICATION METHOD SELECTION FOR EXCHANGING INFORMATION BETWEEN SERVICE REQUESTER AND SERVICE PROVIDER

(75) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 11/196,620

(22) Filed: Aug. 4, 2005

(65) Prior Publication Data
US 2006/0041896 A1 Feb. 23, 2006

(30) Foreign Application Priority Data
Aug. 6, 2004 (JP) .............................. 2004-231417
Jul. 26, 2005 (JP) .............................. 2005-216003

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................................... 719/330
(58) Field of Classification Search ................... 719/330
See application file for complete search history.

(56) References Cited

U.S. PATENT DOCUMENTS

| | | | | |
|---|---|---|---|---|
| 5,535,334 | A * | 7/1996 | Merkley et al. ............. | 709/239 |
| 5,892,903 | A * | 4/1999 | Klaus ......................... | 726/25 |
| 7,000,238 | B2 * | 2/2006 | Nadler et al. ............... | 719/330 |
| 7,290,267 | B2 * | 10/2007 | Brown et al. ................ | 719/330 |
| 7,424,722 | B2 * | 9/2008 | Joseph ....................... | 719/330 |
| 7,487,513 | B1 * | 2/2009 | Savchenko et al. .......... | 719/320 |
| 7,523,159 | B1 * | 4/2009 | Williams et al. ............. | 709/203 |
| 7,529,824 | B2 * | 5/2009 | Joseph ........................ | 709/223 |
| 2003/0070006 | A1 * | 4/2003 | Nadler et al. ................ | 709/330 |
| 2003/0140180 | A1 * | 7/2003 | Brown et al. ................. | 709/330 |
| 2004/0006623 | A1 * | 1/2004 | Gourraud et al. ............. | 709/227 |
| 2004/0044656 | A1 * | 3/2004 | Cheenath ........................ | 707/3 |
| 2004/0064503 | A1 * | 4/2004 | Karakashian et al. ........ | 709/203 |
| 2004/0177335 | A1 * | 9/2004 | Beisiegel et al. ............. | 717/102 |
| 2004/0220952 | A1 * | 11/2004 | Cheenath ..................... | 707/100 |
| 2005/0080873 | A1 * | 4/2005 | Joseph ........................ | 709/227 |
| 2006/0004764 | A1 * | 1/2006 | Kurhekar et al. .............. | 707/10 |
| 2006/0095274 | A1 * | 5/2006 | Phillips et al. .................. | 705/1 |
| 2007/0150546 | A1 * | 6/2007 | Karakashian et al. ........ | 709/207 |
| 2008/0086564 | A1 * | 4/2008 | Putman et al. ............... | 709/227 |

FOREIGN PATENT DOCUMENTS

JP 2004-46817 2/2004

OTHER PUBLICATIONS

Fremantle, P., Weerawarana, S., and Khalaf, R., 'Enterprise services', 2002, Commun. ACM 45, 10, pp. 77-82.*
Mukhi, Web service invocation sans SOAP, IBM, Sep. 2001, pp. 1-6.*

* cited by examiner

*Primary Examiner*—Hyung S Sough
*Assistant Examiner*—KimbleAnn Verdi
(74) *Attorney, Agent, or Firm*—Oblon, Spivak, McClelland, Maier & Neustadt, L.L.P.

(57) ABSTRACT

A service request apparatus, which includes an application using a service provided by another apparatus by connecting to the another apparatus through a network, determines a communication method to call the service in response to a call request for calling a method with respect to the service, the call request sent from the application, and conducts a remote call of the method in response to the call request from the application based on the communication method.

14 Claims, 12 Drawing Sheets

-- Related Art --

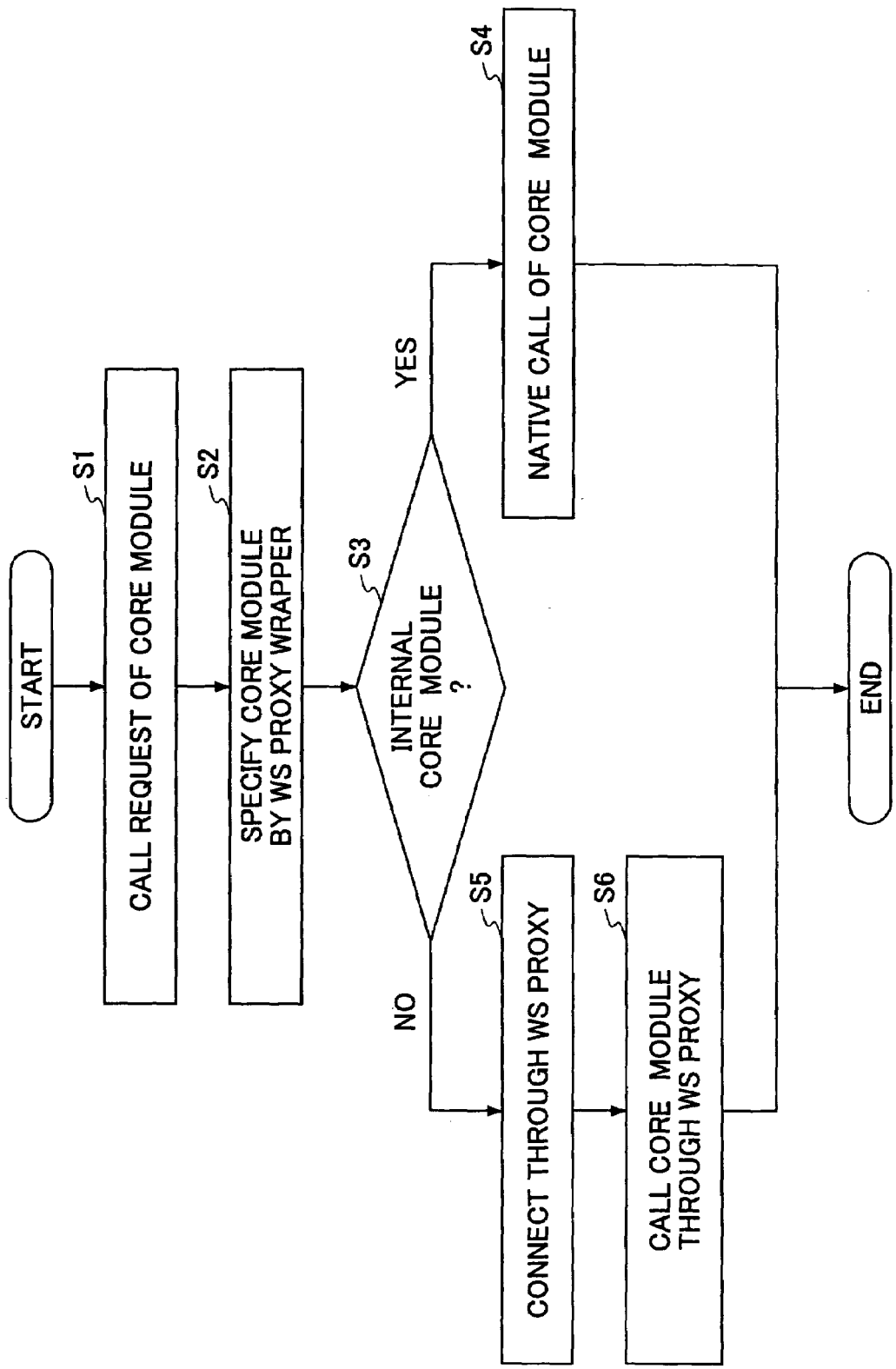

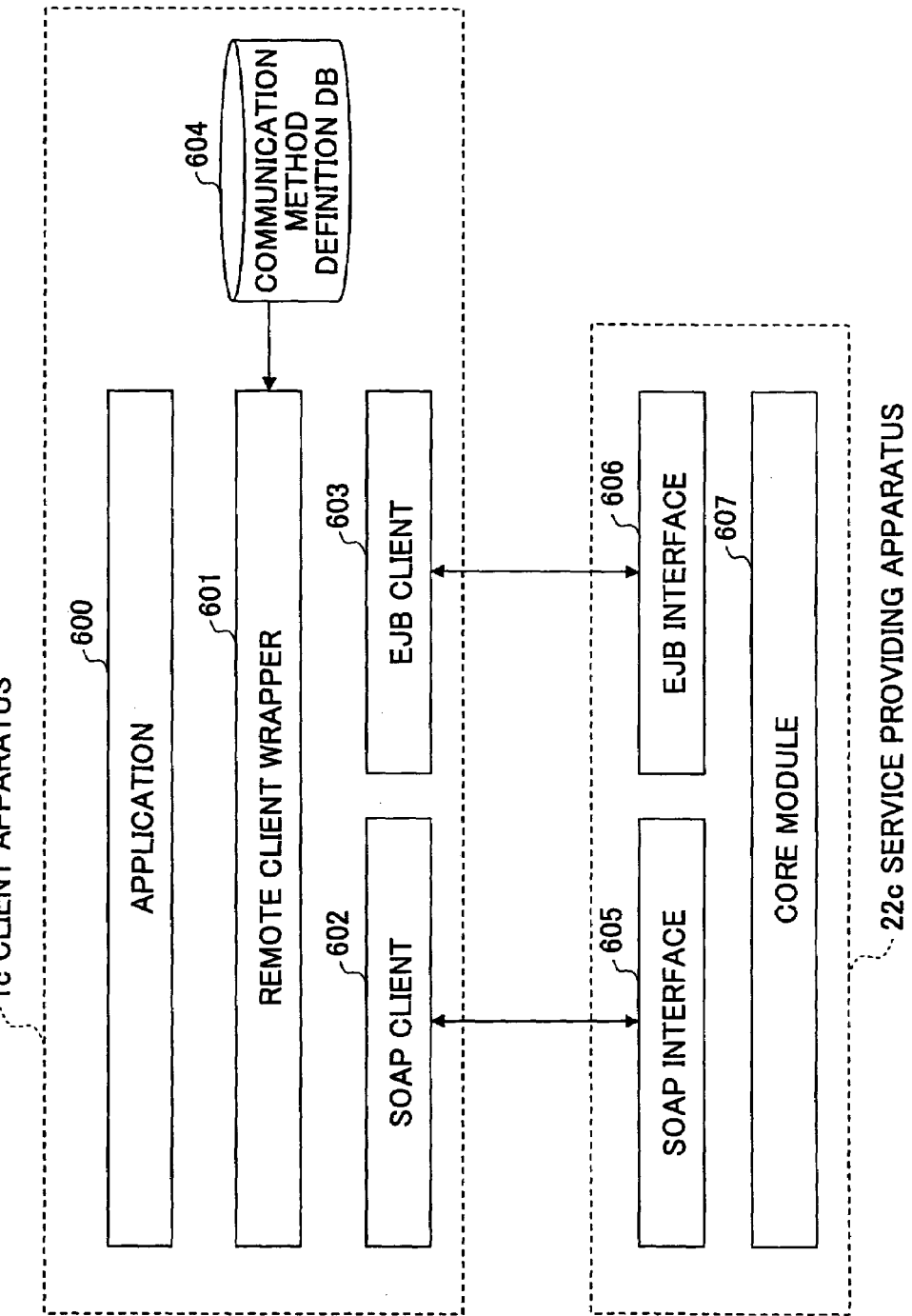

FIG.8

```
<userList>
  <user>
    <ID>111</ID>
    <name>Yamada Taro</name>
    <address>Tokyo</address>
  </user>
  <user>
    <ID>222</ID>
    <name>Tanaka Hanako</name>
    <address>Kanagawa</address>
  </user>
  ...
  ...
  ...
</userList>
```

FIG.9

```
Context initial = new InitialContext();
UserDBHome home =
        (UserDBHome) PortableRemoteObject.narrow(
            initial.lookup("MyUserDB"), UserDBHome.class);
UserDB userDB = home.create();
UserList userList = userDB.getUserList();
```

FIG.11

| SERVER URI | COMMUNICATION METHOD |
|---|---|
| http://xxx.xxx.xxx.xxx/ | SOAP |
| http://yyy.yyy.yyy.yyy/ | EJB |
| http://zzz.zzz.zzz.zzz/ | EJB |
| : | : |
| DEFAULT | EJB |

US 7,624,404 B2

COMMUNICATION METHOD SELECTION FOR EXCHANGING INFORMATION BETWEEN SERVICE REQUESTER AND SERVICE PROVIDER

BACKGROUND OF THE INVENTION

1. Field of the Invention

The present invention generally relates to service request apparatuses, service request methods, service request program products and computer-readable recording media, service providing apparatuses, service providing methods, and service providing program products and computer-readable recording media, and more particularly to a service request apparatus, a service request method, a service request program product and computer-readable recording medium, which include an application using a service provided by another apparatus connected through a network, and a service providing apparatus, a service providing method, a service providing program product and computer-readable recording medium, which can provide a service by using at least two types of communication methods to the service request apparatus.

2. Description of the Related Art

Recently, application software based on a network environment has been developed. As the application software, a Web service technology is included. The Web service is a technology for associating applications being distributed through the network with each other by using a standard Internet technology. By applying the Web service, it is possible to associate the applications with each other by exchanging data based on an XML (Extensible Markup Language) in accordance with a protocol called a SOAP (Simple Object Access Protocol) on a protocol of a standard Internet such as an HTTP (HyperText Transfer Protocol), an FTP (File Transfer Protocol), an SMTP (Simple Mail Transfer Protocol), and a like. The data exchange is conducted between a Web service client for making a request using a SOAP message and a Web service provider for reading contents of the SOAP message and providing a predetermined function. In the following, referring to FIG. 1, a regular Web service system will be described.

FIG. 1 is a system configuration of a regular Web service system. The regular Web service system shown in FIG. 1 includes a Web service client apparatus (hereinafter, simply called a client apparatus) 1 for connecting to any of service providing apparatuses 22, 33, and 44, and for requesting a predetermined function by sending a SOAP message, and Web service providing apparatuses (hereinafter, simply called a service providing apparatuses) 22, 33, and 44 for reading a request by the SOAP message sent from the client apparatus 1, and for providing the predetermined function as a Web service.

Next, an information exchange between the client apparatus 1 and the service providing apparatuses 22, 33, and 44 in the regular Web service system in FIG. 1 will be described with reference to FIG. 2.

FIG. 2 shows software configurations of the client apparatus 1 and the service providing apparatus 22 in FIG. 1. A client module is mounted to the client apparatus 1, a service providing module is mounted to the service providing apparatus 22, and also the service providing module is mounted to each of the service providing apparatus 33 and 44. By exchanging information among these modules through the network 3, the client apparatus 1 and the service providing apparatuses 22, 33, and 44 exchange information with each other. In this case, any network can be used such as a Local Area Network (LAN), the Intranet, the Internet, and a like, regardless of a wired or wireless network.

In the following, the information exchange between the client apparatus 1 and the service providing apparatus 22 will be described with reference to FIG. 2. When a call request is made from a Web service client application (hereinafter, called a WS client application) of the client apparatus 1 to a core module of the service providing apparatus 22, a Web service proxy (hereinafter, called a WS proxy) 201 converts a request sent from the WS client application 200 into a command formed in the XML, stores the command in a SOAP envelope to create a SOAP message, and sends the SOAP message to a Web service listener (hereinafter, called a WS listener) of the service providing apparatus 22 through the network 3. The WS listener 202 of the service providing apparatus 22 parses the SOAP message received from the WS proxy 201 of the client apparatus 1, and searches for a method of the core module 204 to call through a Web service. The WS listener 202 maps an execution result of the method of the core module 204 into a body of the SOAP message, and sends the SOAP message to the client apparatus 1. The WS proxy 201 of the client apparatus 1 receiving the SOAP message as a response, and sends contents (the execution result of the method of the core module 204) to the WS client application 200. By the above-described information exchange, information can be exchanged as the Web service between the client apparatus 1 and the service providing apparatus 22.

Japanese Laid-open Patent Application No. 2004-46817 discloses a technology related to the above-described information exchange.

It should be noted that the above-described information exchange is not limited to a case between the client apparatus 1 and the service providing apparatus, and may be conducted inside the client apparatus 1.

However, even in a case of exchanging information inside an apparatus, the information is sent and received by the SOAP message as described above. Accordingly, there is a problem in that processes concerning a data conversion and communication are not effectively conducted.

Also, since the SOAP uses an HTTP (HyperText Transport Protocol) on a transport layer, in a point in that the SOAP passes through a firewall and realizes an RPC (Remote Procedure Call), the SOAP is superior to other distribution object technologies. However, the SOAP message is a text base in an XML format. Accordingly, in a case in that it is unnecessary to communicate through the firewall and the SOAP message is used to realize the RPC, the communication by using the SOAP message causes a large overhead amount and is degraded.

SUMMARY OF THE INVENTION

It is a general object of the present invention to provide service request apparatuses, service request methods, service request program products and computer-readable recording media, service providing apparatuses, service providing methods, and service providing program products and computer-readable recording media, in which the above-mentioned problems are eliminated.

A more specific object of the present invention is to provide a service request apparatus, a service request method, a service request program product and computer-readable recording medium, a service providing apparatus, a service providing method, and a service providing program product and computer-readable recording medium, in that an information exchange for calling a service can be properly conducted in response to a communication environment.

The above objects of the present invention are achieved by a service request apparatus including an application using a service provided by another apparatus by connecting to the another apparatus through a network, the service request apparatus including: determining a communication method to call the service in response to a call request for calling a method with respect to the service, the call request sent from the application; and conducting a remote call of the method in response to the call request from the application based on the communication method.

Moreover, the above objects of the present invention are achieved by a service providing apparatus capable of providing a service by at least two types of communication methods to a service request apparatus, the service providing apparatus includes: conducting a process defined in a method in response to a call request of the method with respect to the service by one of at least the two types of the communication methods; and returning a process request of the process to the service request apparatus based on the communication method concerning the call request, wherein the service request apparatus, which includes an application using a service provided by another apparatus by connecting to the another apparatus through a network, includes: determining the communication method to call the service in response to the call request for calling a method with respect to the service, the call request sent from the application; and conducting the remote call of the method in response to the call request from the application based on the communication method.

According to the present invention, it is possible to conduct the information exchange to call the service properly to the communication environment.

The above objects of the present invention can be achieved by a program for causing a computer to conduct processes described above in the apparatus or by a computer-readable recording medium recorded with the program code.

BRIEF DESCRIPTION OF THE DRAWINGS

In the following, embodiments of the present invention will be described with reference to the accompanying drawings.

FIG. 6 is a flowchart for explaining a call of a core module according to the second embodiment of the present invention;

FIG. 7 is a diagram showing software configurations of a client apparatus and a service providing apparatus according to a third embodiment of the present invention;

FIG. 8 is a diagram showing a SOAP response example in a case of calling a call-method by SOAP, according to the third embodiment of the present invention;

FIG. 9 is a diagram showing a source code example in a case of calling the call-method by EJB, according to the third embodiment of the present invention;

FIG. 11 is a diagram showing a registration content example of a communication method definition DB according to the third embodiment of the present invention;

DESCRIPTION OF THE PREFERRED EMBODIMENTS

Figure 1:
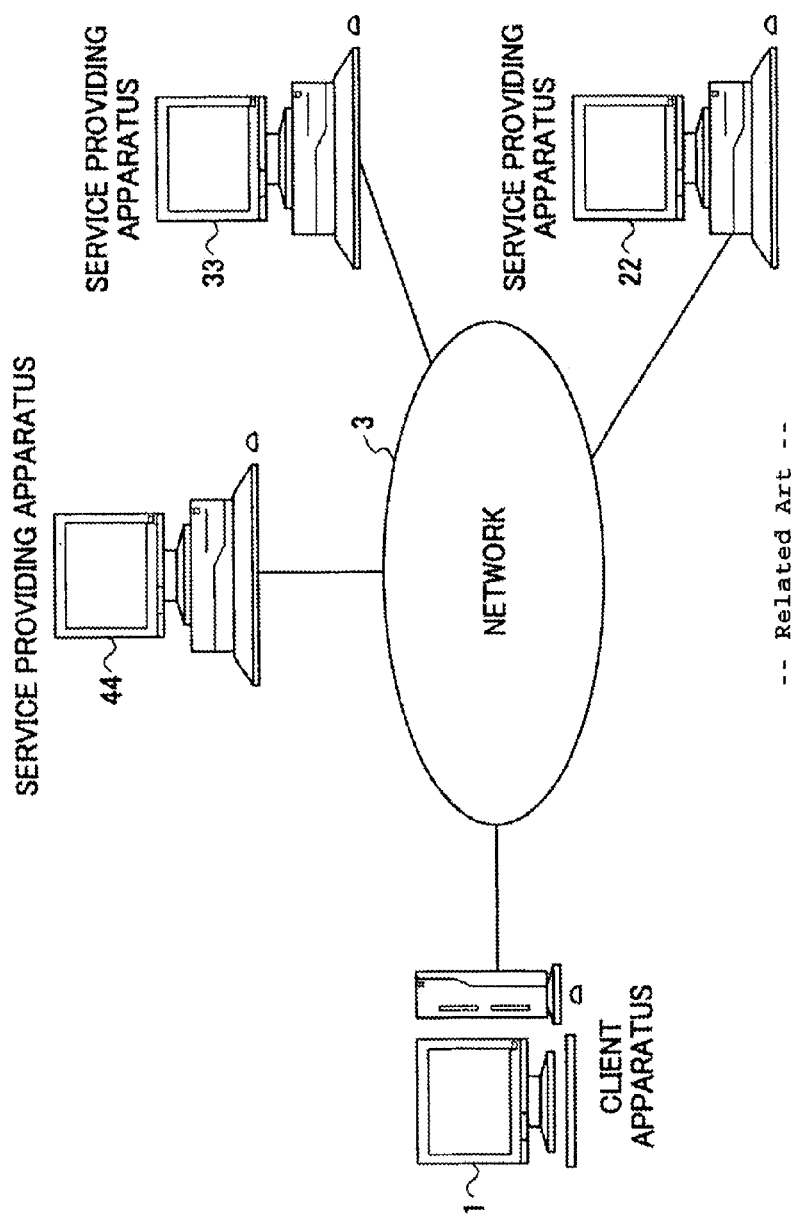
FIG. 1 is a diagram showing a conventional system configuration of a Web service system including a client apparatus and a service providing apparatus.
Figure 2:
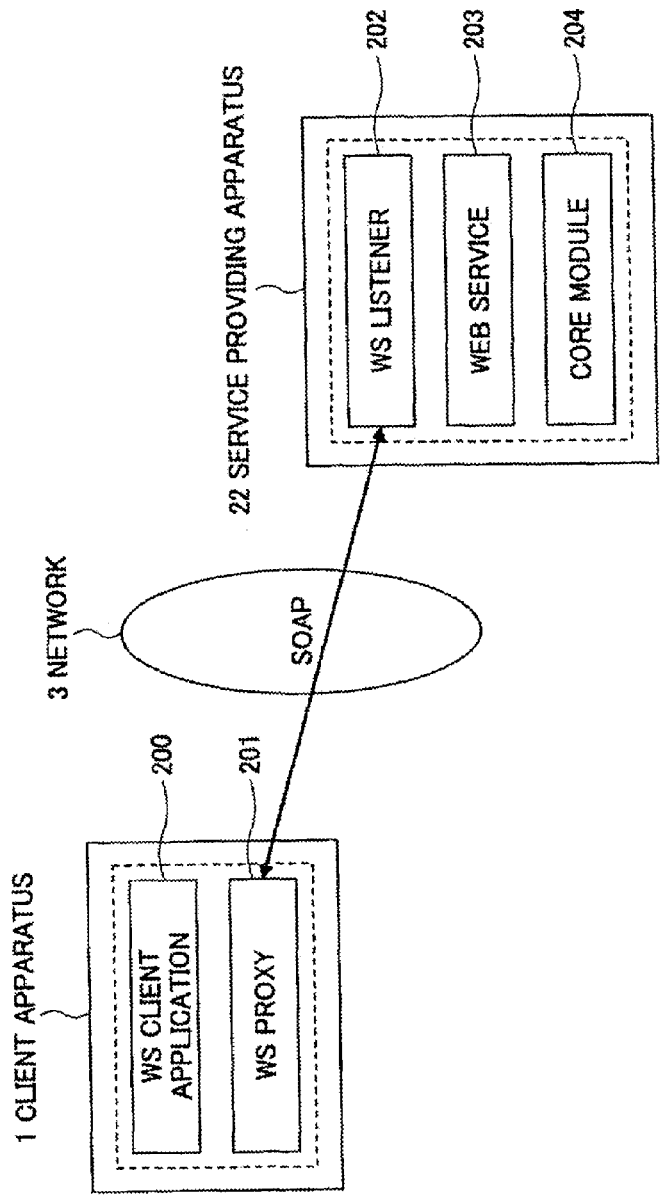
FIG. 2 is a diagram showing an information exchange as a Web service conducted between the client apparatus and the service providing apparatus in the conventional system configuration shown in FIG. 1.

In the following, embodiments of the present invention will be described with reference to the accompanying drawings. In the following embodiments, a system includes a client apparatus 1a, and service providing apparatuses 22a, 33a, and 44a, similar to the system shown in FIG. 1, and explanation of thereof will be omitted.

First Embodiment

Figure 3:
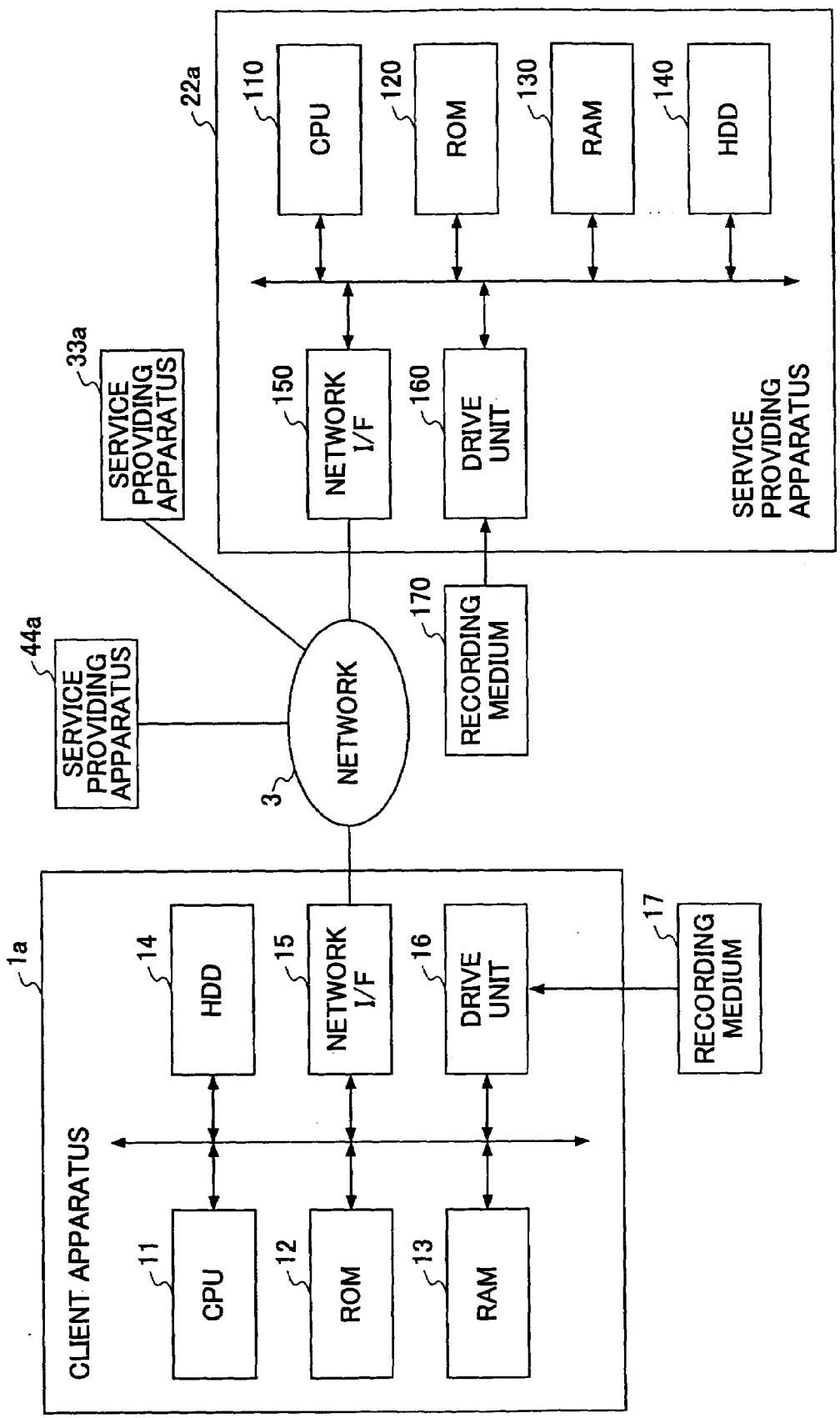
FIG. 3 is a diagram showing hardware configurations of a client apparatus and a service providing apparatus according to a first embodiment of the present invention.

FIG. 3 shows hardware configurations of a client apparatus 1a and service providing apparatuses 22a, 33a, and 44a. The client apparatus 1a and the service providing apparatuses 22, 33, and 44 are PCs (Personal Computers) as well-known hardware. That is, the client apparatus 1a includes a CPU (Central Processing Unit) 11, a ROM (Read-Only Memory) 12, a RAM (Random Access Memory) 13, a hard disk drive (HDD) 14, a network I/F (Interface) 15, and a drive unit 16, which are mutually connected. The client apparatus 1a also connects to a network 3a through the network I/F 15. By installing various application programs to the HDD 14 and causing the CPU 11 to execute the application programs, the client apparatus 1a can achieve various functions. When the various application programs are installed to the HDD 14, a recording medium 17 can be used to install the various application programs to the HDD 14 through the drive unit 16. Programs recorded in the recording medium 17 are client modules shown in FIG. 4 and causes a personal computer to function as the client apparatus 1a. The programs are installed into the HDD 14, and are executed by the CPU 11, so that the CPU 11 can perform as various functional parts which will be described later. Similarly, the service providing apparatus 22a includes a CPU 110, a ROM 120, a RAM 130, a hard disk drive (HDD) 140, a network I/F 150, and a drive unit 160, which are mutually connected. The service providing apparatus 22a also connects to the network 3a through the network I/F 150. By installing various application programs to the HDD 140 and causing the CPU 110 to execute the application programs, the service providing apparatus 22a can achieve various functions. When the various application programs are installed into the HDD 140, a recording medium 170 can be used to install the various application programs to the HDD 140 through the drive unit 160. Programs recorded in the recording medium 170 are client modules shown in FIG. 4 and cause a personal computer to function as the service providing apparatus 22a. The programs are installed into the HDD 140, and are executed by the CPU 110, so that the CPU 110 can perform as various functional parts which will be described later. The service providing apparatus 33a, and 44a are also configured as the same as the service providing apparatus 22a. Thus, in the following, only the service providing apparatus 22a will be described for brevity. Also, the above-described hardware configurations will be applied in the following embodiments.

Figure 4:
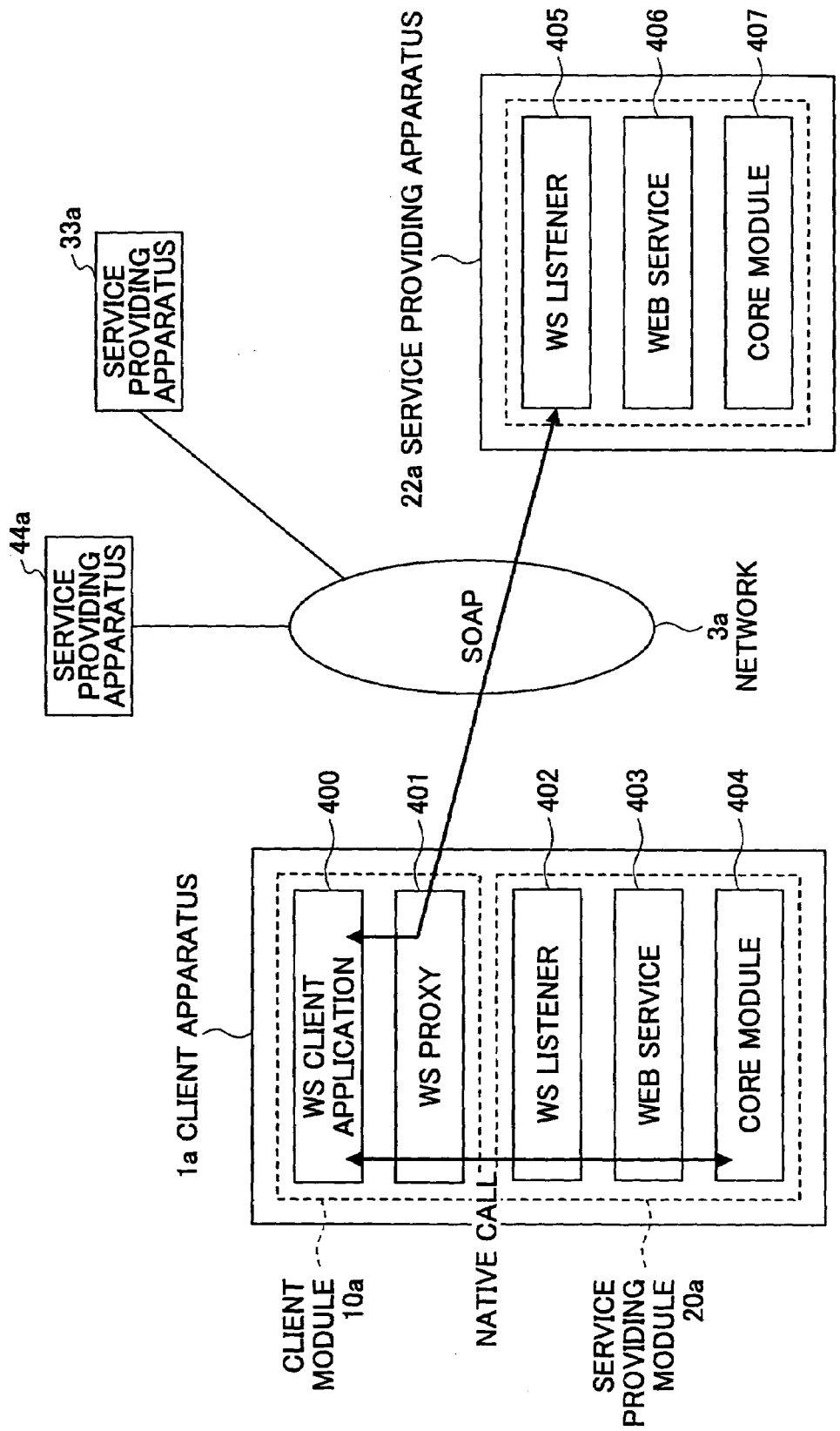
FIG. 4 is a diagram showing software configurations of the client apparatus and the service providing apparatus according the first embodiment of the present invention.

FIG. 4 shows software configurations of the client apparatus 1a and the service providing apparatus 22a according to the first embodiment of the present invention. The client apparatus 1a includes a client module 10a, and a service providing module 20a as software. Next, each of the client module 10a and the service providing module 20a will be described.

[Client Module]

The client module 10a includes a WS client application 400, and a WS proxy 401. The WS client application 400 functions as a client of a Web service for conducting call requests to core modules 404 and 407, which will be described later, and conducts a determination process concerning the call requests to the core module 404 and 407. The WS client application 400 can be any application which can function as a client of the Web service, such as a Web application passing information to a lower module based on an input from a Web browser (not shown), a special application operating on an operating system such as Windows™, or a like.

The WS proxy 401 is automatically generated from a WSDL (Web Service Description Language), and includes an API (Application Program Interface) for the client module 10a to use the core module 404. When the client apparatus 1a conducts a connection process with the service providing apparatus 22a being an external apparatus, the WS proxy 401 sends a call request created by the WS client application 400 to the service providing apparatus 22a as the SOAP message.

[Service Providing Module]

The service providing module 20a includes a WS listener 402, a Web service 403, and the core module 404. The WS listener 402 parses the SOAP message when the WS listener 402 receives the SOAP message, and converts the SOAP message into a format type in which a lower module can process. The Web service 403 is a part to open a function of a relative core module to the outside. A main logic of this process is mounted to the core module 404, which will be described later. Hence, the Web service 403 itself does not have a special logic, because a method corresponding to the core module 404 is inhibited to be different from process contents of the Web service 403. The core module 404 implements a main logic for conducting a predetermined method in response to a call request from the client module 10a, and also includes a function as a service providing part for returning an execution result to an upper module.

In the first embodiment, the WS client application 400 has a feature of conducting a call process for calling the core module 404 being as a service object by a native call, instead of passing through the WS proxy 401, the WS listener 402, and the Web service 403.

FIG. 4 shows a software configuration of the service providing apparatus 22a in that the service providing apparatus 22a is an external apparatus of the client apparatus 1a to return a result of a method execution process by the service providing module 20a with respect to the SOAP message sent from the WS proxy 401 of the client apparatus 1a.

A WS listener 405, a Web service 406, and the core module 407 are of the same configuration as the WS listener 402, the Web service 403, and the core module 404 in the client apparatus 1a, and explanations thereof will be omitted.

Next, process operations of the client apparatus 1a and the service providing apparatus 22a will be described according to the first embodiment of the present invention. The WS client application 400 of the client apparatus 1a starts a call process of a core module, which is to be a call subject, based on a command of a service providing request. The command of the service providing request includes location information to specify a location of the core module being the call subject. When the WS client application 400 determines that the core module being called exists with the WS client application 400, that is, when the WS client application 400 determines that the core module exists in the client apparatus 1a of the WS client application 400, the WS client application 400 conducts the native call to directly call a class method of the core module 404. When the core module 404 is called, the core module 404 returns an execution result of the class method to the WS client application 400.

On the other hand, when the WS client application 400 determines, based on the location information included in the command, that the core module as the call subject does not exist in the client apparatus 1a, the WS client application 400 connects to the service providing apparatus 22a being the external apparatus in the same procedure as a connection process of a regular Web service through the WS proxy 401. That is, the WS proxy 401 converts the command issued from the WS client application 400 into a command in the XML format, stores the command in the XML format in the SOAP envelope, and sends the SOAP message to the service providing apparatus 22a. After the WS listener 405 of the service providing apparatus 22a conducts a type conversion, a method is executed by the core method 407 through the Web service 406. An execution result is sent as the SOAP message to the client apparatus 1a through the WS listener 405. The client apparatus 1a parses the SOAP message by the WS proxy 401, and the execution result of the method is returned to the WS client application 400.

As specific information for the WS client application 400 to specify whether or not the core module being the call subject exists inside the client apparatus 1a, for example, a URI (Uniform Resource Identifier) specifying the core module, an IP address included in the URI, or a like can be used. The specific information is information to include the command created when the WS client application 400 calls the core module, and is used to determine whether or not the core module being the call subject exists in its apparatus. When it is determined whether or not the core module being the call subject exists in the client apparatus 1a, the WS client application 400 conducts a switching process for switching a call process to call the core module as described above, directly accesses the core module 404 of the client apparatus 1a itself by using the native call, and then receives a service conducted by a predetermined function.

By configuring as described above, it is possible to overcome the problems concerning the communication in a case in that the core module being the call subject exists in the client apparatus 1a. Thus, it is possible to call a respective core module without changing a mechanism for conducting a conventional connection process with the external apparatus, and changing an implementation to correspond to a new call process.

Moreover, in a case in that a function provided by the core module is related to document data (information including application data and image data), if a conventional call process for calling the core module existing in the external apparatus is used, it is required to create and store a temporary file used for a data conversion to attach data to the SOAP message as if the SOAP message is sent to the external apparatus, and for an analysis of the SOAP message as if the SOAP message is received to the external apparatus. However, by configuring as described above, the temporary file is not required, and the problems raised in the conventional configuration can be overcome.

In the first embodiment, the WS client application 400 includes a determination logic to determine whether or not the core module being the call subject exists in the client apparatus 1a. The WS client application 400 may be required to consider the determination logic to be implemented in the client apparatus 1a. Accordingly, the following embodiment is provided according to the present invention to solve this problem.

Second Embodiment

Figure 5:
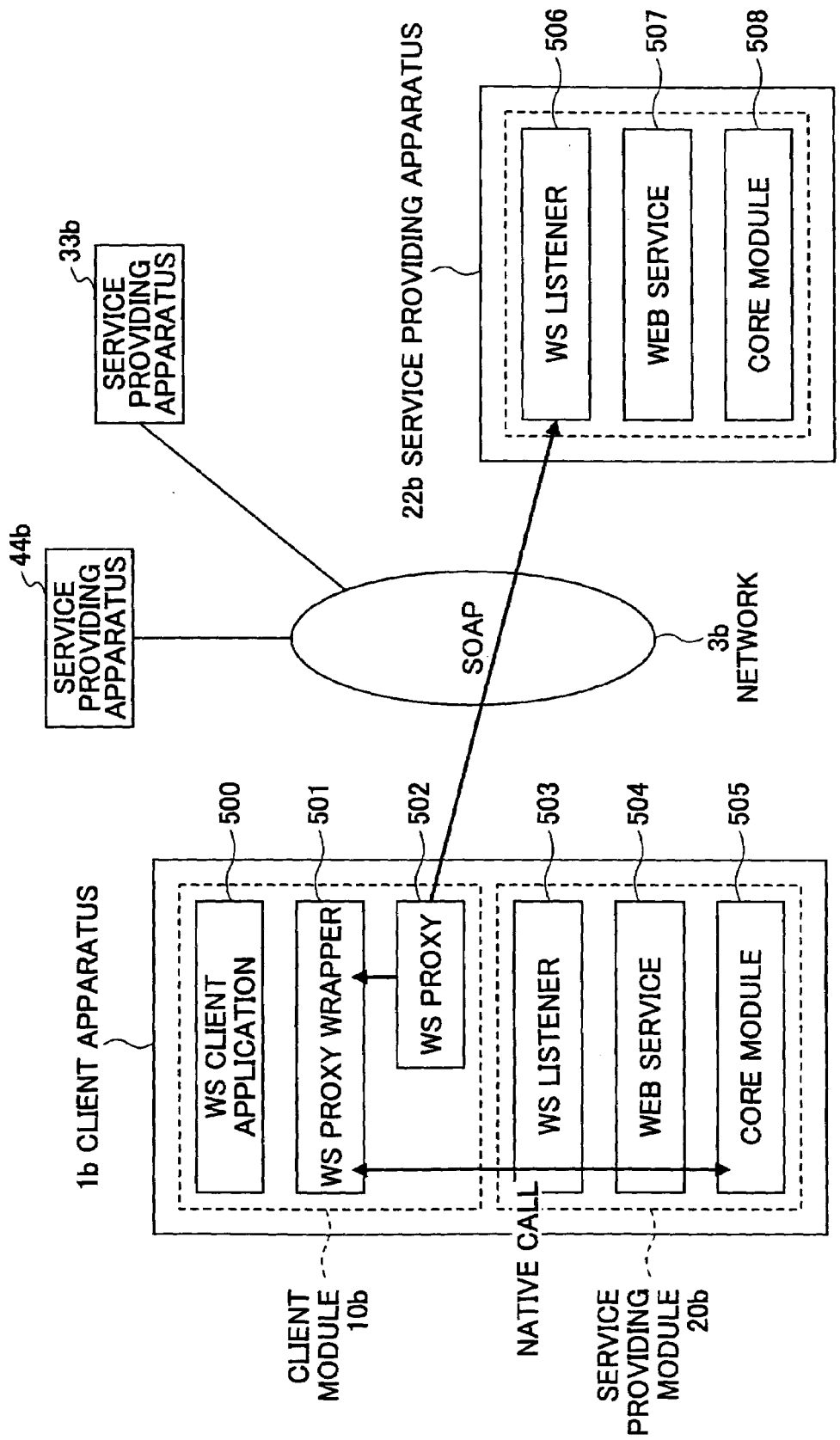
FIG. 5 is a diagram showing the software configurations of a client apparatus and a service providing apparatus according to a second embodiment of the present invention.

In the following, a second embodiment will be described with reference to FIG. 5 and FIG. 6. In FIG. 5 and FIG. 6, hardware configurations of a client apparatus 1b and service providing apparatuses 22b, 33b, and 44b are the same as the hardware configuration of the client apparatus 1a and the service providing apparatuses 22a, 33a, and 44b in the first embodiment, and explanations thereof will be omitted. The client apparatus 1b is connected to the service providing apparatuses 22b, 33b, and 44b through a network 3b. The service providing apparatuses 22b, 33b, and 44b correspond to the service providing apparatuses 22a, 33a, and 44a in the first embodiment, and each of service providing apparatuses 22b, 33b, and 44b includes a WS listener 506, a Web service 507, and a core module 508, which correspond to the WS listener 406, the Web service 407, and the core module 408 in the first embodiment, respectively. The client apparatus 1b includes mainly a client module 10b and a service providing module 20b. The client module 10b includes a WS client application 500, a Web service proxy wrapper (hereinafter, called a WS proxy wrapper) 501, and a WS proxy 502. The WS client application 500 and the WS proxy 502 correspond to the WS client application 400 and the WS proxy 401 in the first embodiment, respectively. The service providing module 20b includes a WS listener 503, a Web service 504, and a core module 505, which correspond to the WS listener 402, the Web service 403, and the core module 404 in the first embodiment, respectively.

Different from FIG. 4 in the first embodiment, the client apparatus 1b further includes the WS proxy wrapper 501. The WS proxy wrapper 501 is an upper module of the WS proxy 502 automatically generated by the WSDL, and includes the same interface as the WS proxy 502. In the second embodiment, the WS proxy wrapper 501 functions as a determination part. Similar to the first embodiment, a call request of a core module from the WS client application 500 includes location information specifying a location of the core module being a call subject. In addition, the modules in the second embodiment operate similar to the modules in the second embodiment. In the following, referring to FIG. 6, a process passing through the WS proxy wrapper 501 in the client apparatus 1b will be described.

A command of the call request of the core module from the WS client application 500 is input to the WS proxy wrapper 501 (step S1), the location of the core module is specified by the WS proxy wrapper 501 (step S2). When a determination result by the WS proxy wrapper 501 shows that the core module being the call subject exists in the client apparatus 1b, that is, when it is determined, based information showing the location of the core module, that the core module exists in the client apparatus 1b (Yes in step S3), the WS proxy wrapper 501 conducts a native call as described in the first embodiment without passing through the WS proxy 502 (step S4). When the core module 505 is called, the core module 505 conducts a process similarly to the core module 404 in the first embodiment, and returns an execution result of a method to the WS client application 500 through the WS proxy wrapper 501.

On the other hand, when a determination result in the step S3 shows that the client apparatus 1b does not implement the core module being the call subject (No in step the S3), the WS proxy wrapper 501 conducts a connection process with an external apparatus through the WS proxy 502 (step S5). Similar to the first embodiment, the WS proxy 502 conducts a general process concerning a SOAP process such as a parsing process for parsing the SOAP message, and calls the core module 508 as the call subject from the service providing apparatus 22b being the external apparatus (step S6). Thus, a result of a predetermined process conducted by the core module 508 is sent as the SOAP message. After the WS proxy 502 parses the SOAP message received from the service providing apparatus 22b, the execution result of the method is returned to the WS client application 500 through the WS proxy wrapper 501.

As described above, in the second embodiment, the WS proxy wrapper 501 determines whether or not the core module being the call subject exists in the client apparatus 1b. Advantageously, the WS client application 500 is not required to consider and implement the determination logic. If the client apparatus 1b implements a plurality of the WS client applications 500, the WS proxy wrapper 501 can be shared with the plurality of the WS client applications 500 to conduct the call process. Advantageously, each of the WS client applications 500 is not required to include a similar determination logic.

In the first embodiment and the second embodiment, calls from the WS client application 400 and 500 are classified into the native call and a call (remote call) through the network 3a or 3b, and the process concerning the native call is described to effectively realize.

An architecture in order to realize a remote call in a distribution object technology is not limited to the Web service using the SOAP. For example, an EJB (Enterprise Java-Beans™) realized by Java™ can be used for the architecture. As one of advantages to use the SOAP, the SOAP can pass through a firewall and realize the remote call. Accordingly, the SOAP is suitable to realize the remote call in a communication environment of communicating through the Internet. On the other hand, if the SOAP is used to realize the remote call in a network system using the firewall, it becomes inefficient because of a specification of the SOAP message. That is, the SOAP message is formed by a message in a test base using the XML, and the size of data becomes greater. Thus, the SOAP message is likely to increase a communication quantity. The following embodiment is provided to solve this problem.

Third Embodiment

FIG. 7 is a diagram showing software configurations of a client apparatus and a service providing apparatus according to a third embodiment of the present invention.

In FIG. 7, a client apparatus 1c includes an application 600, a remote client wrapper 601, a SOAP client 602, an EJB client 603, and a communication method definition DB 604. The application 600, the remote client wrapper 601, and the SOAP client 602 correspond to the WS client application 500, the WS proxy wrapper 501, and the WS proxy 502 in the second embodiment, respectively. A service providing apparatus 22c includes a SOAP interface 605, an EJB interface 606, and a core module 607. The client apparatus 1c connects to the service providing apparatus 22c. That is, the application 600 realizes a function as an application by utilizing a service provided by the core module 607. In this case, the application 600 does not call the core module 607 directly. Instead, the application 600 indirectly calls the core module 607 by conducting the remote call through an interface, which is not dependent on a communication protocol provided by the remote client wrapper 601.

The remote client wrapper 601 determines whether or not to call the SOAP or the EJB for a request the application 600 to the core module 607, and then calls the core module in accordance with a call method (communication method) in response to a determination result.

For example, as one of methods provided from the remote client wrapper 601 to the application 600, the following:

UserList userList=getUserList( ); Can be considered. When this method is called from the application 600, and the SOAP is used to call this method with respect to the service providing apparatus 22, a response in an XML format as shown in FIG. 8 is returned. Accordingly, in this case, the remote client wrapper 601 converts the response in the XML format as shown in FIG. 8 into a UserList type, and returns the response to the application 600.

Also, when the method is called with respect to the service providing apparatus 22c by the EJB, the remote client wrapper 601 conducts a process based on a source code as shown in FIG. 9, so as to realize the remote call by the EJB.

That is, the remote client wrapper 601 takes a difference between protocols or between the distribution object architectures, into the remote client wrapper 601 itself, and provides a common interface which can be shared with any application 600. Thus, the application 600 can make a request to the core module 607 without considering the difference between the protocols, or the like.

The SOAP client 602 functions as a client to make the remote call by the SOAP, and exchanges the SOAP message between the SOAP client 602 and the SOAP interface 605 of the service providing apparatus 22c. The EJB client 603 functions as a client to make the remote call by the EJB, and communicates with the EJB interface 606 of the service providing apparatus 22c to make the remote call.

On the other hand, in the service providing apparatus 22 in FIG. 7, the SOAP interface 605 corresponds to the WS listener 506 and the Web service 507 in the second embodiment. That is, the SOAP interface 605 interprets the remote call (SOAP message) in accordance with the SOAP from the client apparatus 1c, and call a function (method) of the core module 607 corresponding to the remote call.

The EJB interface 606 interprets the remote call by the EJB from the client apparatus 1c, and calls the method of the core module 607 corresponding to the remote call. That is, the service providing apparatus 22c can provide the function of the core module 607 in response to the remote call based on two types of communication methods such as the SOAP and the EJB.

In the following, process procedures of the client apparatus 1c and the service providing apparatus 22c in FIG. 7 will be described.

Figure 10:
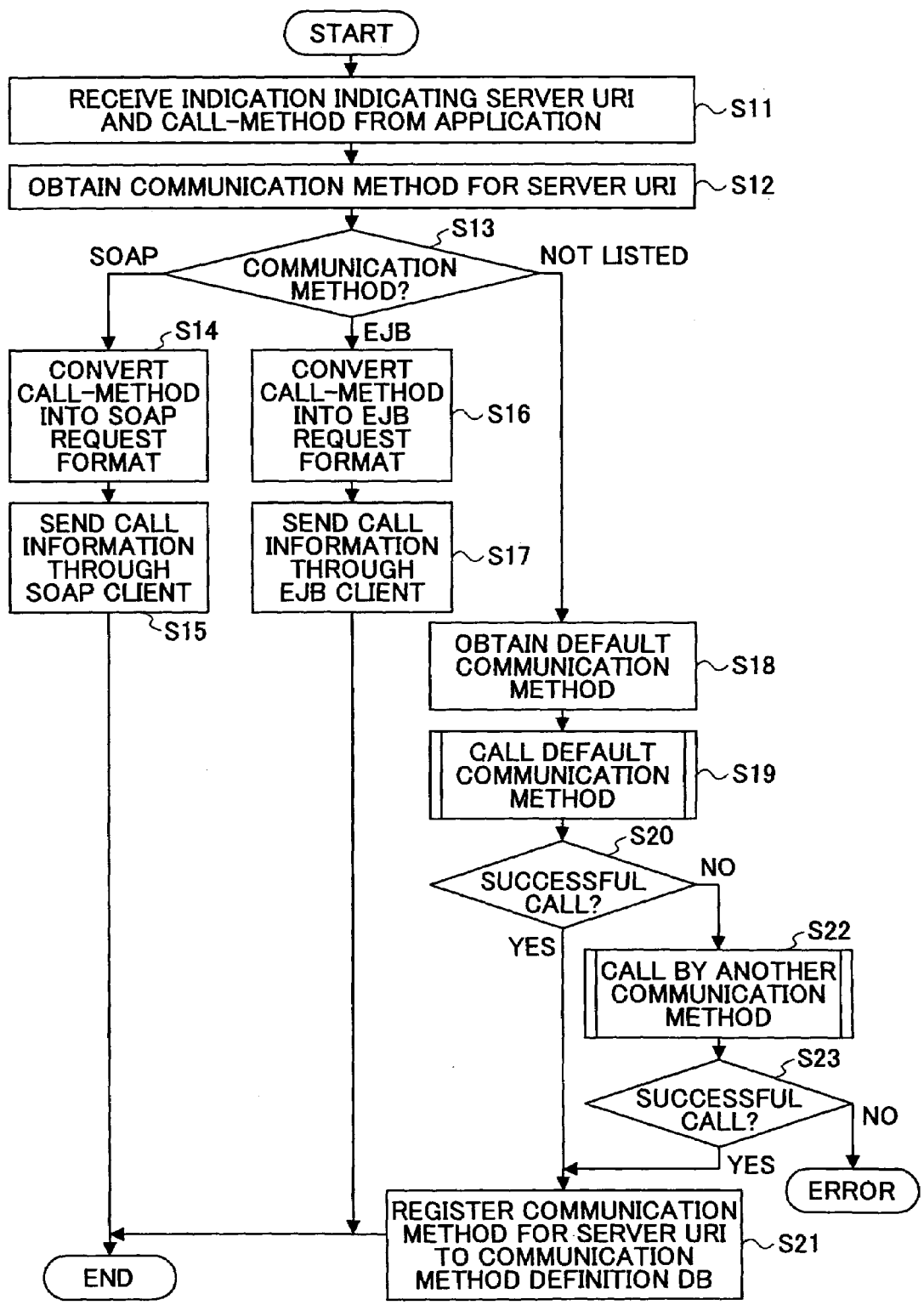
FIG. 10 is a flowchart for explaining a process procedure of a remote client wrapper when the core module is called, according to the third embodiment of the present invention.

FIG. 10 is a flowchart for explaining a process procedure of the remote client wrapper in a case of calling the core module, according to the third embodiment of the present invention.

When the remote client wrapper 601 receives a call request with respect to the core module 607 by receiving an indication indicating an identification name (for example, a method name) of a call-method and a server URI (Uniform Resource Identifier) of a call destination from the application 600 (step S11), the remote client wrapper 601 obtains the communication method (SOAP or EJB) for the service URI indicated by the call request from the communication method definition DB 604 (step S12).

FIG. 11 is a diagram showing a registration content example of the communication method definition DB according to the third embodiment of the present invention. As shown in FIG. 11, the communication method is defined for each server URI in the communication method definition DB 604. For example, In FIG. 11, the communication method is the SOAP in a case of the server URI "http://xxx.xxx.xxx.xxx/", and the communication method is the EJB in a case of the server URI "http://yyy.yyy.yyy.yyy/". In FIG. 11, a record registering a value "default" for the server URI is applied in a case in that the application 600 does not indicate the communication method for the server URI. In an example shown in FIG. 11, the communication method for the value "default" for the server URI is the EJB.

Accordingly, the remote client wrapper 601 determines the communication method to communicate with the server being the call destination to call the method based on the server URI, by referring to the communication method definition DB 604 (step S13).

When the communication method for the server URI is set to be the SOAP (SOAP in step S13), the remote client wrapper 601 converts the call information concerning the call-method into a SOAP request format described in the XML format (step S14), and sends the call information (SOAP message) concerning the call-method with respect to the core module 607 through the SOAP client 602 (step S15).

When the communication method for the server URI is set to be the EJB (EJB in step S13), the remote client wrapper 601 converts the call information concerning the call-method into an EJB request format (step S16), and sends the call information concerning the call-method with respect to the core module 607 to the service providing apparatus 22c through the EJB client 603 (step S17).

On the other hand, when there is no record corresponding to the server URI (not listed in the step S13), the remote client wrapper 601 obtains a default communication method from the communication method definition DB 604 (step S18), and calls the call-method by the default communication method (step S19). That is, when the default communication method is defined as the SOAP, processes as the same as the step S14 and the step S15 are conducted (step S19). On the other hand, when the default communication method is the EJB, processes as the same as the step S16 and the step S17 are conducted in the step S19.

Consequently, the remote client wrapper 601 determines whether or not the call-method is successfully called by the default communication method (step S20). This determination process may be conducted based on whether or not a return value is normally obtained from the call-method in response to the call. When the call is successfully conducted by the default communication method (Yes in the step S20), the remote client wrapper 601 registers the default communication method by associating with the server URI, which is not registered when the call is made, into the communication method definition DB 604 (step S21). Accordingly, from a next call, the remote client wrapper 601 directly obtains the communication method for the server URI from the communication method definition DB 604.

On the other hand, when the default communication method fails to call the call-method (No in the step S20), the remote client wrapper 601 attempts to call by another communication method other than the default communication method (step S22). That is, when the default communication method is the EJB, the call-method is called by the SOAP.

When the call is successfully conducted by the another communication method (Yes in step S23), the remote client wrapper 601 registers the another communication method to the communication method definition DB 604 by associating with the server URI (in the step S21). On the other hand, when the another communication method fails to call the call-method (No in the step S23), the remote client wrapper 601 returns an error to the application 600.

Figure 12:
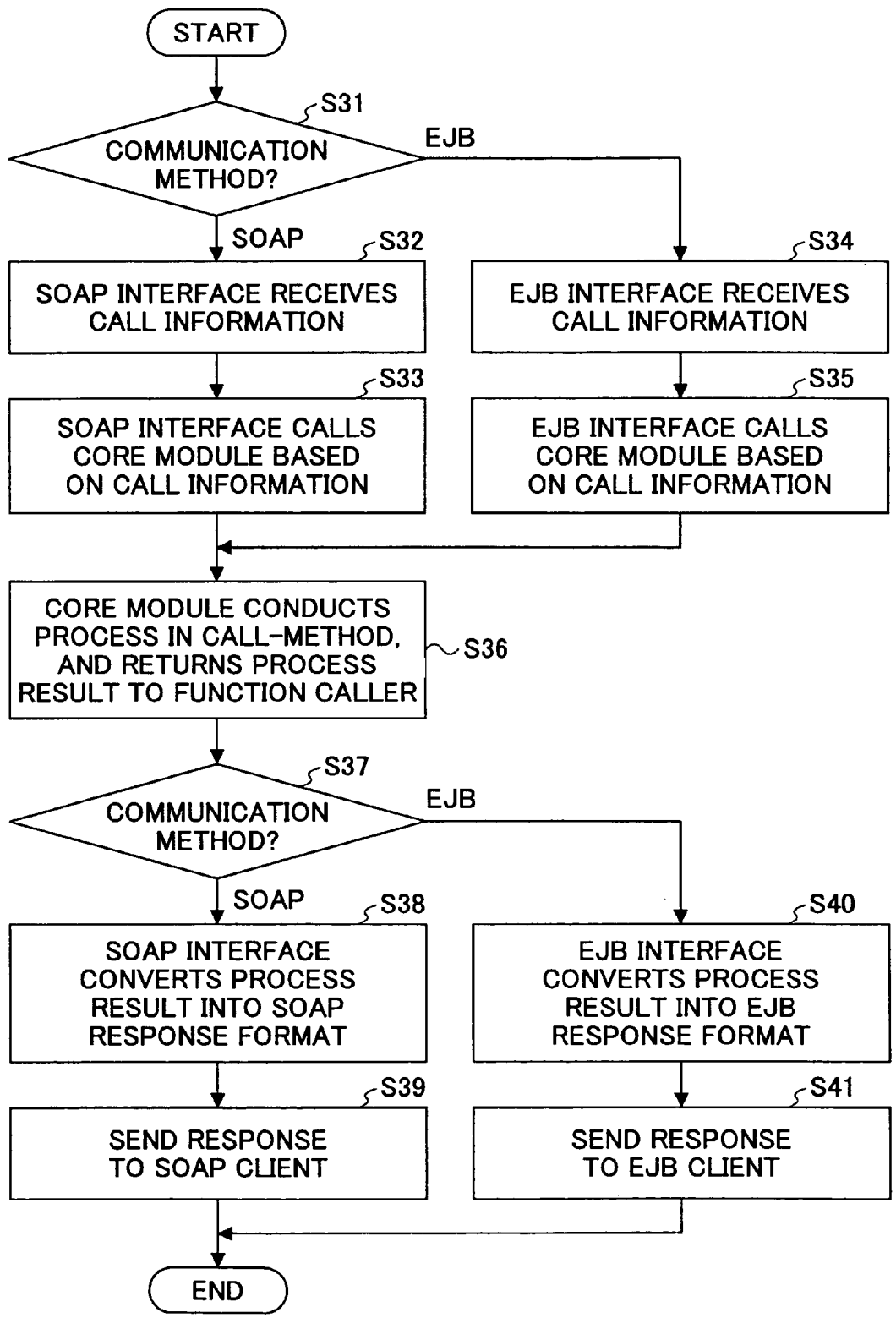
FIG. 12 is a flowchart for explaining a process procedure of the service providing apparatus receiving a remote call according to the third embodiment of the present invention.

Next, the process procedure at the service providing apparatus 22c being the call destination to call the call-method by the SOAP or the EJB will be described. FIG. 12 is a flowchart for explaining the process procedure of the service providing apparatus receiving the remote call, according to the third embodiment of the present invention.

When the communication method is the SOAP (that is, when the call-method is called by the SOAP) (SOAP in step S31), the SOAP interface 605 receives the call information (SOAP message) in accordance with the SOAP (step S32), and calls the call-method of the core module 607 based on the SOAP message (step S33).

On the other hand, when the communication method is the EJB (that is, when the call-method is called by the EJB) (EJB in the step S31), the EJB interface 606 receives the call information in accordance with the EJB (step S34), and calls the call-method of the core module 607 based on the call information (step S35).

When the call-method is called to the core module 607, the core module 607 conducts a process defined in the call-method, and returns a process result to a caller (the SOAP interface 605 or the EJB interface 606) (step S36).

When the communication method is the SOAP (SOAP in step S37), the SOAP interface 605 converts the process result returned from the core module 607 into a SOAP response format (step S38), and sends a SOAP response to the SOAP client 602 of the client apparatus 1c (step S39).

On the other hand, when the communication method is the EJB (EJB in step S37), the EJB interface 606 converts the process result returned from the core module 607 into an EJB response format (step S40), and sends an EJB response to the EJB client 603 (step S41).

Figure 13:
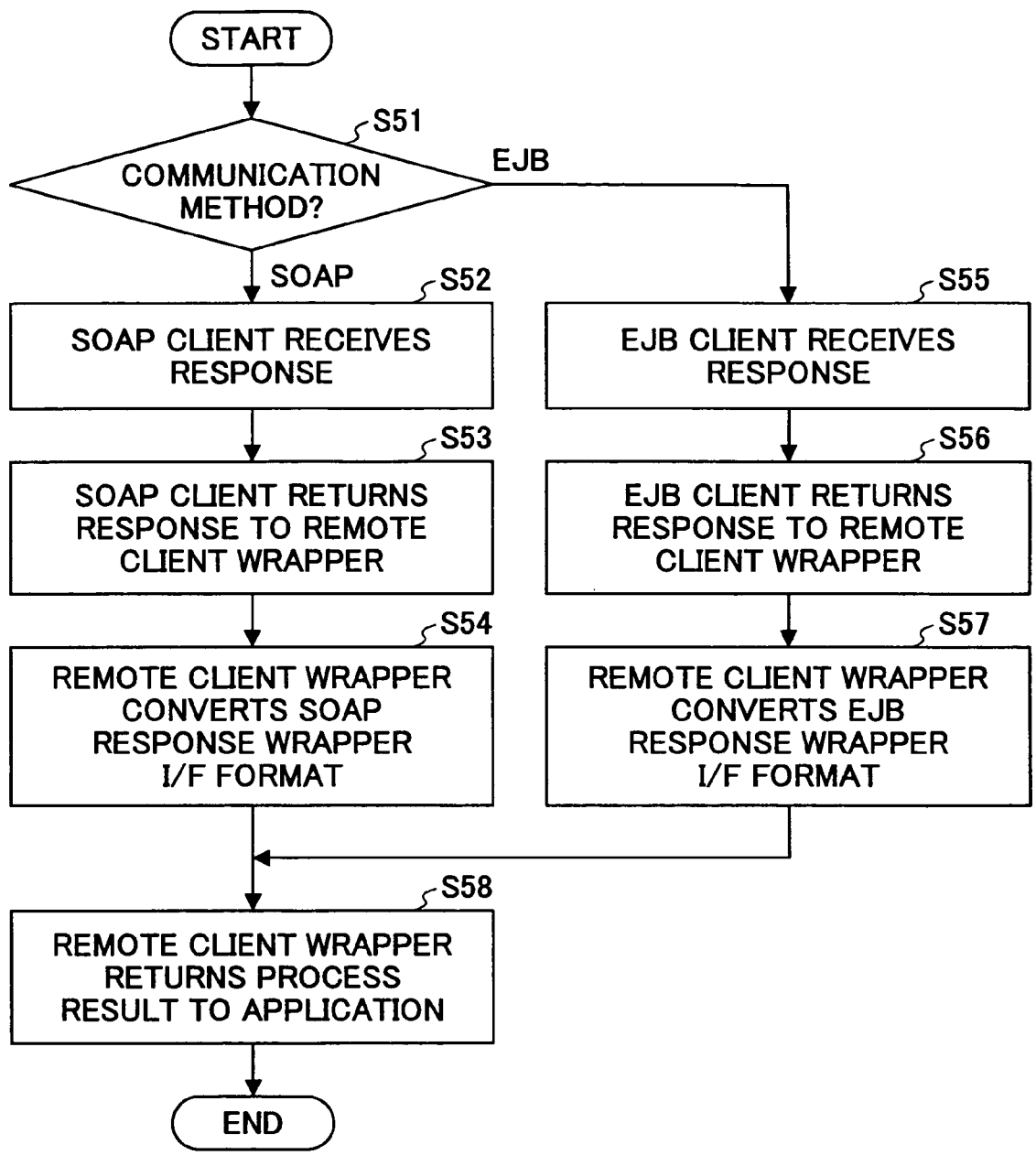
FIG. 13 is a flowchart for explaining a process procedure of the client apparatus receiving a response from the service providing apparatus according to the third embodiment of the present invention.

Subsequently, the process procedure of the client apparatus 1c receiving a response from the service providing apparatus 22c will be described. FIG. 13 is a flowchart for explaining the process procedure of the client apparatus receiving the response from the service providing apparatus, according to the third embodiment.

When the communication method is the SOAP (that is, when the call-method is called by the SOAP) (SOAP in step S51), the SOAP client 602 receives the SOAP response from the SOAP interface 605 of the service providing apparatus 22c (step S52), the SOAP client 602 returns the SOAP response to the remote client wrapper 601 (step S53). The remote client wrapper 601 receiving the SOAP response converts the SOAP response into an interface format (for example, an interpretable format for the application 600 such as a C language structure) provided to the application 600 (step S54), and returns a converted process result to the application 600 (step S58).

On the other hand, when the communication method is the EJB (that is, when the call-method is called by the EJB) (EJB in the step S51), the EJB client 603 receives the response by the EJB from the EJB interface 605 of the service providing apparatus 22c (step S55), and returns the response to the remote client wrapper 601 (step S56). When the remote client wrapper 601 receives the response by the EJB, the remote client wrapper 601 converts the response into the interpretable format for the application 600 (step S57), and returns a converted process result to the application 600 (step S58).

As described above, according to the third embodiment, the client apparatus 1c can utilize a function of the service providing apparatus 22c by any one of remote calls by the SOAP passing through the firewall and by the EJB, which has higher process efficiency than the SOAP but cannot always pass through the firewall. Accordingly, with respect to the remote call within the firewall, the function of the core module 607 can be effectively utilized by using the EJB.

In the third embodiment, the EJB is exemplified as a higher speed remote call method than the SOAP, but for example, an RMI (Remote Method Invocation™) being a lower lever than the EJB can be used. Alternatively, other architectures or other protocol such as a DCOM (Distributed COM), CORBA (Common Object Request Broker Architecture), and a like can be used.

According to the present invention, it is possible to conduct the information exchange to call the service properly to the communication environment.

The present invention is not limited to the specifically disclosed embodiments, and variations and modifications may be made without departing from the scope of the present invention. For example, the above-described processes according to the present invention can be achieved by a program for causing a computer to conduct processes described above in the apparatus or by a computer-readable recording medium recorded with the program code.

The present application is based on the Japanese Priority Applications No. 2004-231417 filed on Aug. 6, 2004 and No. 2005-216003 filed on Jul. 26, 2005, the entire contents of which are hereby incorporated by reference.

What is claimed is:

1. A service request apparatus including an application using, among a plurality of services, a service provided by another apparatus by connecting to the another apparatus through a network, the service request apparatus comprising:
    a processor determining a communication method from a plurality of communication methods to call the service in response to a call request for calling a method with respect to the service based on communication method definition information stored in a memory of the service request apparatus, the communication method definition information specifying a communication method for each service, the call request being sent from the application, conducting a remote call of the method in response to the call request from the application based on the determined communication method, and switching to another communication method from the plurality of communication methods until the remote call is successfully conducted, when the communication method definition information does not specify the communication method to call the service,
    wherein the call request of the method with respect to the service from the application includes information indicating a method identification name and a URI specifying the service;
    the remote call is made based on a default communication method when the communication method to call the service is not defined in the communication method definition information; and
    when the communication method to call the service is not defined in the communication method definition information and the remote call succeeds by the default communication method, the default communication method used for the remote call is registered to the communication method definition information by associating with the service.

2. The service request apparatus as claimed in claim 1, wherein the remote call is made based on another communication method when the remote call in accordance with the default communication method fails.

3. The service request apparatus as claimed in claim 1, wherein return information returned from another apparatus in response to the remote call is converted into an interpretable format for the application from a format based on the communication method.

4. The service request apparatus as claimed in claim 1, wherein the plurality of communication methods include a first communication method possible to pass through a firewall, and a second communication method having a higher process efficiency than the first communication method.

5. The service request apparatus as claimed in claim 4, wherein the first communication method is a communication method using a structural description language.

6. The service request apparatus as claimed in claim 5, wherein the structural description language includes an extensible markup language.

7. The service request apparatus as claimed in claim 4, wherein the second communication method is a communication method using Enterprise JavaBeans or Remote Method Invocation.

8. A service system comprising a service providing apparatus and a service request apparatus, the service providing apparatus providing a service by at least two types of communication methods to the service request apparatus,
wherein the service providing apparatus comprises: a service providing processor conducting a process defined in a method in response to a call request of the method with respect to the service by one of the at least two types of the communication methods, and returning a process request of the process to the service request apparatus based on the one of the at least two types of the communication methods concerning the call request;
wherein the service request apparatus comprises an application using, among a plurality of services, a service provided by another apparatus by connecting to the another apparatus through a network, the service request apparatus further comprising:
a service requesting processor determining the one of the at least two types of the communication methods to call the service in response to the call request for calling a method with respect to the service based on communication method definition information stored in a memory of the service request apparatus, the communication method definition information specifying a communication method for each service, the call request being sent from the application, and conducting a remote call of the method in response to the call request from the application based on the communication method and to switch to another communication method from the at least two types of the communication methods until the remote call is successfully conducted, when the communication method definition information does not specify the communication method to call the service;
wherein the call request of the method with respect to the service from the application includes information indicating a method identification name and a URI specifying the service;
wherein the remote call is made based on a default communication method when the communication method to call the service is not defined in the communication method definition information; and
wherein when the communication method to call the service is not defined in the communication method definition information and the remote call succeeds by the default communication method, the default communication method used for the remote call is registered to the communication method definition information by associating with the service.

9. The service providing apparatus as claimed in claim 8, wherein the at least two types of communication methods include a first communication method possible to pass through a firewall, and a second communication method having a higher process efficiency than the first communication method.

10. The service providing apparatus as claimed in claim 9, wherein the first communication method is a communication method using a structural description language.

11. The service providing apparatus as claimed in claim 10, wherein the structural description language includes an extensible markup language.

12. The service providing apparatus as claimed in claim 9, wherein the second communication method is a communication method using Enterprise JavaBeans or Remote Method Invocation.

13. A service request method conducted in a service request apparatus including an application using, among a plurality of services, a service provided by another apparatus by connecting to the another apparatus through a network, the service request method comprising:
determining a communication method from a plurality of communication methods to call the service in response to a call request for calling a method with respect to the service based on communication method definition information stored in a memory of the service request apparatus, the communication method definition information specifying a communication method for each service, the call request being sent from the application;
conducting a remote call of the method in response to the call request from the application based on the determined communication method; and
switching to another communication method from the plurality of communication methods until the remote call is successfully conducted, when the communication method definition information does not specify the communication method to call the service,
wherein the call request of the method with respect to the service from the application includes information indicating a method identification name and a URI specifying the service;
the remote call is made based on a default communication method when the communication method to call the service is not defined in the communication method definition information; and
when the communication method to call the service is not defined in the communication method definition information and the remote call succeeds by the default communication method, the default communication method used for the remote call is registered to the communication method definition information by associating with the service.

14. A service request program product comprising a computer-readable recording medium recorded with a service request program for causing a computer to use, among a plurality of services, a service provided by another apparatus connected through a network, the service request program, when executed by a processor, performing the steps of:

determining a communication method from a plurality of communication methods to call the service in response to a call request for calling a method with respect to the service based on communication method definition information stored in a memory of the service request apparatus, the communication method definition information specifying a communication method for each service, the call request being sent from an application;

conducting a remote call of the method in response to the call request from the application based on the determined communication method; and switching to another communication method from the plurality of communication methods until the remote call is successfully conducted, when the communication method definition information does not specify the communication method to call the service, wherein the call request of the method with respect to the service from the application includes information indicating a method identification name and a URI specifying the service;

the remote call is made based on a default communication method when the communication method to call the service is not defined in the communication method definition information; and when the communication method to call the service is not defined in the communication method definition information and the remote call succeeds by the default communication method, the default communication method used for the remote call is registered to the communication method definition information by associating with the service.

* * * * *